(12) United States Patent
Kunimochi (10) Patent No.: US 9,151,885 B2
(45) Date of Patent: Oct. 6, 2015

(54) SPREAD ILLUMINATION APPARATUS (71) Applicant: MINEBEA CO., LTD., Kitasaku-gun, Nagano (JP)

(72) Inventor: Toru Kunimochi, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 96 days.

(21) Appl. No.: 13/921,716

(22) Filed: Jun. 19, 2013

(65) Prior Publication Data

US 2014/0241009 A1  Aug. 28, 2014

(30) Foreign Application Priority Data

Feb. 25, 2013  (JP) ................. 2013-034620

(51) Int. Cl.
*F21V 7/04* (2006.01)
*F21V 8/00* (2006.01)

(52) U.S. Cl.
CPC ...................................... *G02B 6/002* (2013.01)

(58) Field of Classification Search
USPC ................................................. 362/621, 628
See application file for complete search history.

(56) References Cited

U.S. PATENT DOCUMENTS

| 6,044,196 A | 3/2000 | Winston et al. |
| 2011/0205759 A1 | 8/2011 | Kurata et al. |

FOREIGN PATENT DOCUMENTS

| JP | A-11-306830 | 11/1999 |
| JP | A-2007-5015 | 1/2007 |
| JP | A-2007-287550 | 11/2007 |
| JP | A-2008-170739 | 7/2008 |
| JP | A-2009-81014 | 4/2009 |
| JP | A-2009-245669 | 10/2009 |
| JP | A-2010-44994 | 2/2010 |
| JP | A-2012-22863 | 2/2012 |
| WO | WO 2010/060033 A1 | 5/2010 |
| WO | WO 2011/019785 A1 | 2/2011 |

OTHER PUBLICATIONS

Extended European Search Report issued in European Application No. 13173772.8 dated Nov. 4, 2013.

*Primary Examiner* — Meghan Ulanday
(74) *Attorney, Agent, or Firm* — Oliff PLC (57) ABSTRACT

A spread illumination apparatus includes: a light source; and a light guide plate having a light entrance surface on which the light source is disposed, and a light exit surface through which light introduced from the light entrance surface is emitted, wherein the light guide plate includes a light entrance wedge portion which has an inclined surface and of which thickness is thinner from the light entrance surface side toward the light exit surface side, the inclined surface includes a first, a second, and a third inclined surface portions, and an average inclination angle of the second inclined surface portion at an arbitrary cross section perpendicular to the light entrance surface and the light exit surface along the light entrance surface in a longitudinal direction is configured to be larger than average inclination angles of the first inclined surface portion and the third inclined surface portion.

9 Claims, 9 Drawing Sheets

SPREAD ILLUMINATION APPARATUS

BACKGROUND OF THE INVENTION

1. Field of the Invention

The present invention relates to a sidelight-type spread illumination apparatus including a light source and a light guide plate. The light source is arranged on the light entrance end surface of the light guide plate, and planar illumination light exits from the light exit portion of the light guide plate.

2. Description of the Related Art

In the illuminating units of a liquid crystal display panel, there is a sidelight-type spread illumination apparatus (backlight) with small LEDs having excellent environmental compatibility which are arranged along the side end surface of a light guide plate. This type of the spread illumination apparatus has been widely adopted especially in the fields of small portable information devices, for example, portable phones. Recently, for achieving further thin small portable information devices, there is provided a light guide plate whose light entrance wedge portion is arranged between the light entrance surface and a light exit portion, the light entrance wedge portion being configured as that its thickness gradually decreases as moving away from a side end surface (or the light entrance surface) on which LEDs are arranged. In use of such a light guide plate, the light exit portion of the light guide plate becomes thin, regardless of the thickness of the LED (see, for example, JP 2007-287550 A and JP 2008-170739 A).

Request for the thin liquid crystal display device however has become more intense. Consequently, a spread illumination apparatus used for the backlight of the liquid crystal display device needs to be further thin. Here, when the thickness of applied LEDs and the length of the light entrance wedge portion in a light guide direction are fixed, to achieve further thinned light exit portion, it is necessary to increase inclination angle of an inclined surface of the light entrance wedge portion. If however the inclination angle increases, light leakage from the light entrance wedge portion and the vicinity thereof on the light exit portion increase, which degrades luminance of light emitted from the light exit portion used as illumination light, and deteriorates the luminance distribution of illumination light.

SUMMARY OF THE INVENTION

The present invention has been made in light of the above problems, and an object of the present invention is to provide a spread illumination apparatus with a light exit portion successfully thin, without causing degradation of luminance and deterioration of luminance distribution.

An aspect of the present invention described hereinafter is just an example of a configuration of the present invention and will be described for facilitating understanding of various configurations of the present invention. The aspect does not limit the technical scope of the present invention. While considering the best mode for carrying out the invention, the aspect may be modified by replacing or deleting a part of components of the aspect or adding another component, and such modifications may also fall within the technical scope of the present invention.

According to a first aspect of the invention, there is provided a spread illumination apparatus including: a light source; and a light guide plate having a light entrance surface on which the light source is disposed, and a light exit surface through which light incident from the light entrance surface is emitted, wherein the light guide plate includes a light entrance wedge portion which has an inclined surface and of which thickness is thinner from the light entrance surface side toward the light exit surface side, the inclined surface includes, from the light entrance surface side, a first inclined surface portion, a second inclined surface portion, and a third inclined surface portion, and an average inclination angle of the second inclined surface portion at an arbitrary cross section perpendicular to the light entrance surface and the light exit surface along the light entrance surface in a longitudinal direction is larger than an average inclination angle of the first inclined surface portion and the third inclined surface portion at the same cross section.

The present inventors have conducted extensive research to solve the problems and obtained a knowledge that in a light entrance wedge portion of a recent light guide plate on which thinning and slim bezel have been progressed, the risk of occurrence of light leakage was higher in a region close to the light entrance surface and a region close to the light exit surface than a central region. The present invention has been completed based on such a new knowledge.

With this structure, the inclined surface of the light entrance wedge portion provided to be thinner from the light entrance surface side toward the light exit surface side, includes, from the light entrance surface side, a first inclined surface portion, a second inclined surface portion, and a third inclined surface portion. An average inclination angle of the second inclined surface portion (a central region) within a cross section perpendicular to the light entrance surface and the light exit surface at an arbitrary position of the light entrance surface in a longitudinal direction is larger than an average inclination angle of the first inclined surface portion (region close to the light entrance surface) and the third inclined surface portion (region close to the light exit surface) within the same cross section. With this structure, it is possible to effectively reduce light leakage from the region close to the light entrance surface and the region close to the light exit surface in the light entrance wedge portion, where the risk of occurrence of light leakage is relatively high, and it is possible to reduce light emitted from the region close to the light entrance wedge portion of the light exit surface.

According to the first aspect, a connecting portion of the first inclined surface portion and the second inclined surface portion, and a connecting portion of the second inclined surface portion and the third inclined surface portion are configured as a curved surface.

With this structure, light leakage can be more effectively reduced by appropriately setting the shape of the inclined surface based on the change in the risk of occurrence of light leakage according to the distance of the light entrance wedge portion from the light entrance surface.

According to the first aspect, the inclined surface is configured as a single continuous curved surface as a whole.

With this structure, since the inclined surface is configured as a single continuous curved surface as a whole, the inclination angle of the inclined surface changes continuously spatially along the direction perpendicular to the light entrance surface within an arbitrary side cross section. The shape of the inclined surface can be appropriately set with high degree of freedom, based on the change in the risk of occurrence of light leakage according to the distance of the light entrance wedge portion from the light entrance surface, and light leakage can be more effectively reduced.

According to the first aspect, the continuous curved surface is a curved surface which has a convex shape in the light entrance surface side and a concave shape in the light exit surface side.

With this structure, in the light entrance wedge portion of the light guide plate on which thinning and slim bezel have been progressed, light leakage can be more effectively reduced by forming the inclined surface in the most appropriate shape with respect to the typical change in the risk of occurrence of light leakage according to the distance from the light entrance surface.

According to the first aspect, the continuous curved surface is formed in an S-shape in section, and has an inflection point within the second inclined surface portion.

With this structure, the inclined surface having the most appropriate shape can be formed easily and effectively.

According to the first aspect, at least one of the first inclined surface portion, the second inclined surface portion, and the third inclined surface portion is configured to have a plurality of flat surfaces.

With this structure, the shape of the inclined surface can be easily formed based on the change in the risk of occurrence of light leakage according to the distance of the light entrance wedge portion from the light entrance surface, and light leakage can be more effectively reduced.

According to the first aspect, the inclined surface is provided on the light exit surface side.

According to the first aspect, a flat portion with a constant thickness is provided between the light entrance surface and the light entrance wedge portion.

According to the present invention, it is possible to provide the spread illumination apparatus which can make the light exit portion thin, without causing degradation of luminance and deterioration of luminance distribution.

DETAILED DESCRIPTION OF THE PREFERRED EMBODIMENTS

Hereinafter, each spread illumination apparatus according to embodiments of the present invention is explained with reference to the attached drawings. In the accompanying drawings, shapes, dimension, and the like of respective elements may be illustrated in an exaggerated manner for easy understanding of the present invention. Moreover, when two elements are illustrated adjacent to each other with space, the space may be virtually provided or exaggeratingly illustrated for easy understanding. The configuration or the concept of the present invention intends not being affected either by the presence or absence of the space between any elements adjacent to each other, or not being affected by the size of the space.

Figure 1A:
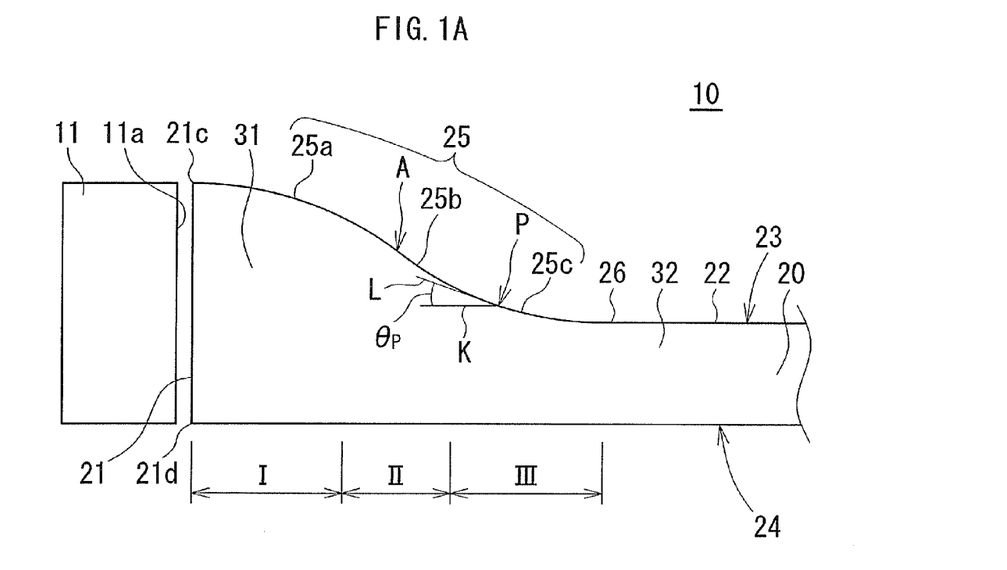
FIG. 1A is a side view illustrating essential parts of a spread illumination apparatus according to an embodiment of the present invention.

A spread illumination apparatus 10 according to the first embodiment of the present invention, as illustrated in FIG. 1A, includes an LED 11 as a light source, and a light guide plate 20 configured to exit light emitted from the LED 11 in a planar manner. In a top view, the light guide plate 20 is formed into a rectangular shape. Further, the light guide plate 20 is made of a transparent material (for example, polycarbonate resin). The light guide plate 20 has a light entrance surface 21 on which the LED 11 is disposed. In the light guide plate 20, a light exit surface 22 and an inclined surface 25 (described hereinbelow) are both provided on a surface connecting to one edge 21c (the upper surface of the light guide plate 20 when viewed FIG. 1 in plane). Hereinbelow, a surface of a side including the light exit surface 22 is referred to a front surface 23, and a surface opposite to the front surface 23 is referred to a rear surface 24.

In the present invention, a direction moving from the light entrance surface 21 toward an end surface (not illustrated but configured to face the light entrance surface 21) is referred to a "forward direction" (that is, a direction moving right on a plane surface of FIG. 1A). Further, a direction opposite to the forward direction is referred to a "backward direction." Here, the meaning of the "forward direction" includes a direction where light introduced into the light guide plate 20 from the light entrance surface 21 is whole guided within the light guide plate 20. In this sense, the forward/backward direction as defined above is also referred to a "light guide direction".

Also, a direction in which the rear surface 24 directs toward the front surface 23 is defined as an "upward direction" (that is, a direction moving upward on a plane surface of FIG. 1A). Further, a direction opposite to the upward direction is defined as a "downward direction." The upward/downward direction of the above is also referred to a "thickness direction." Furthermore, a direction perpendicular to the forward/backward direction and the upward/downward direction (a direction moving perpendicular to a plane surface of FIG. 1A) is also referred to a left/right direction (if necessary, being defined as a "right direction" and a "left direction" in the forward direction). In other words, the left/right direction is a longitudinal direction of the light entrance surface 21. Also, unless otherwise explicitly specified, "length", "thickness", and "width" refer to dimensions of the forward/backward direction, the upward/downward direction", and the "left/right direction", respectively.

From the light entrance surface 21 side toward the forward direction, the light guide plate 20 comprises a light entrance wedge portion 31 including the inclined surface 25, and a light exit portion 32 including the light exit surface 22. The rear surface 24 of the light guide plate 20 is formed to be a single flat surface throughout the light entrance wedge portion 31 and the light exit portion 32. On the other hand, the inclined surface 25 of the light entrance wedge portion 31 is formed to have an inclination moving downward from the light entrance surface 21 side toward the forward direction. The light entrance wedge portion 31 is thus configured to become thinner as moving from the light entrance surface 21 side toward the light exit surface 22 side. The light exit surface 22 is made as a flat surface substantially perpendicular to the light entrance surface 21. The light exit surface 22 is formed to have a connection with an edge 26 of the inclined surface 25 in the forward direction. The rear surface 24 faces the light exit surface 22 substantially in parallel.

Figure 1B:
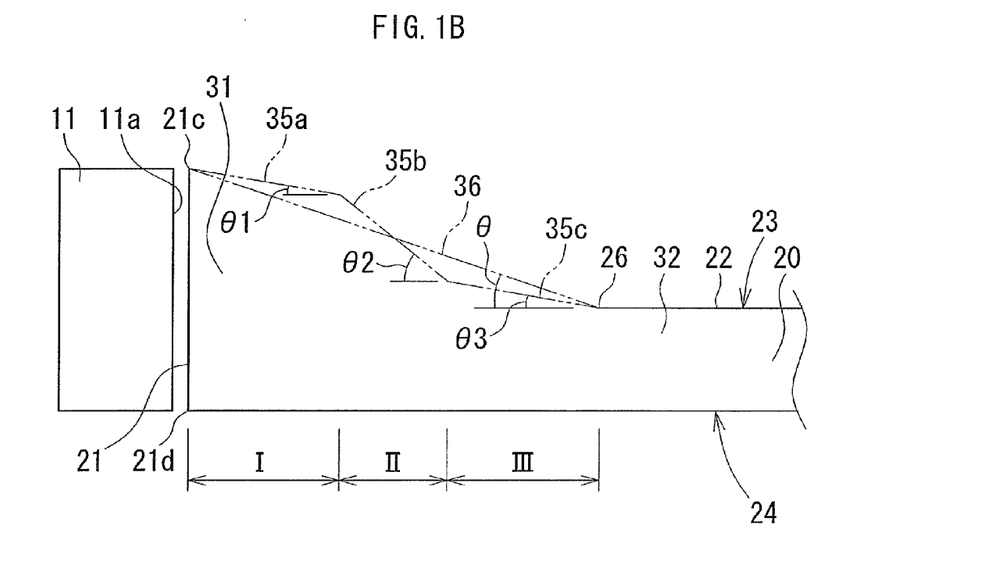
FIG. 1B is a side view schematically illustrating characteristics of the spread illumination apparatus of FIG. 1A.

Next, the configuration of the inclined surface 25 of the light entrance wedge portion 31, which is the main feature of the spread illumination apparatus 10, is described in detail with reference to FIG. 1B together with FIG. 1A. FIG. 1B is a schematic side view for describing the feature of the light entrance wedge portion 31 of the light guide plate 20 of the spread illumination apparatus 10 illustrated in FIG. 1A.

Also, in the spread illumination apparatus 10, a cross-sectional shape of a cross section of the light entrance wedge portion 31, which is perpendicular to the light entrance surface 21 and the light exit surface 22, (cross section by a cutting plane parallel to the plane of paper in FIG. 1A), is identical to a shape of a side surface illustrated in FIG. 1A at an arbitrary position of the light entrance surface 21 in a longitudinal direction. Therefore, in the following description, the feature common to such an arbitrary cross section will be described based on the side views illustrated in FIGS. 1A and 1B.

In the present invention, an inclination angle $\theta p$ at an arbitrary position (for example, position P) on the inclined surface 25 of the light entrance wedge portion 31 is an angle definable by a half line K extending from the position P toward the light entrance surface 21 in parallel to the light exit surface 22 and a half line L extending from the position P toward the light entrance surface 21 in contact with the inclined surface 25 (in other words, an angle that corresponds to a rising slope in each side cross section passing through the position P of the inclined surface 25). The angle defined above is formable in each cross section which passes through the position P, the cross section being formed perpendicularly relative to the light entrance surface 21 and the light exit surface 22 (cutting parallel to the plane of paper in FIG. 1A, which will be simply referred to as a "side cross section hereinafter).

In the light guide plate 20, since the inclined surface 25 is configured as a single continuous curved surface as a whole, the inclination angle of the inclined surface 25 changes continuously and spatially along the forward/backward direction at any arbitrary side cross sections.

However, the inclined surface 25 of the light guide plate 20 is formed to satisfy the inclination angle in the following condition. Starting from the light entrance surface 21 side, the inclined surface 25 has a first inclined surface portion 25a (a range denoted by "I" in FIG. 1A), a second inclined surface portion 25b (a range denoted by "II" in FIG. 1A), and a third inclined surface portion 25c (a range denoted by "III" in FIG. 1A). The inclined surface 25 is configured such that an average inclination angle $\theta 2$ of the second inclined surface portion 25b is greater than an average inclination angle $\theta 1$ of the first inclined surface portion 25a and is also greater than an average inclination angle $\theta 3$ of the third inclined surface portion 25c. Here, the average inclination angle of the inclined surface 25 in a specific range is an angle obtained by averaging inclination angles of respective positions within the range over the entire range.

In the illustrated example, the first and third inclined surface portions 25a and 25c are formed such that the average inclination angles $\theta 1$ and $\theta 3$ are smaller than the average inclination angle $\theta$ over the entire length of the light entrance wedge portion 31 of the inclined surface 25. In FIG. 1B, examples of the respective average inclination angles $\theta 1$, $\theta 2$ and $\theta 3$ of the first, second and third inclined surface portions 25a, 25b and 25c and the average inclination angle $\theta$ over the entire length of the light entrance wedge portion 31 of the inclined surface 25 are illustrated together with virtual plane surfaces 35a, 35b, 35c and 36, respectively, having average inclination angles $\theta 1$, $\theta 2$, $\theta 3$ and $\theta$ as inclination angles thereof. In FIG. 1B, the virtual plane surface 36 is made correspondent to the shape of an inclined surface of a general light entrance wedge portion in conventional spread illumination apparatuses.

In the light guide plate 20, the inclined surface 25 with the first, second and third inclined surface portions 25a, 25b and 25c is realized to have a single continuous curved surface as a whole. Here, the continuous curved surface becomes closer toward the rear surface 24 in the forward direction as moving from the light entrance surface 21 side. The light entrance surface 21 side is formed to have a curved surface of a convex shape, and the light exit surface 22 side is formed to have a curved surface of a concave shape. In the illustrated example, in the side surface shape (arbitrary side cross-sections) illustrated in FIG. 1A, an S-shaped curve indicating the inclined surface 25 has an inflection point A within the second inclined surface portion 25b. The first inclined surface portion 25a, and an area defined between the first inclined surface portion 25a side and the inflection point A of the second inclined surface portion 25b are configured to have a convex shape. Further, an area defined between the third inclined surface portion 25c side and the inflection point A of the second inclined surface portion 25b, and the third inclined surface portion 25c are configured to have a concave shape.

Next, the operational effect of the spread illumination apparatus 10 is described with reference to FIGS. 2 to 6.

First, in a conventional spread illumination apparatus, in which an inclined surface of a light entrance wedge portion has a single inclination angle $\theta$ like the virtual plane surface 36 illustrated in FIG. 1B, a positional dependency of light leakage on the inclined surface is described.

Also, in the following description, for the sake of convenience, reference numeral 36 is assigned to refer to the inclined surface in the conventional spread illumination apparatus, and the same reference numerals as those of the spread illumination apparatus 10 are assigned to refer to the other elements.

Among lights introduced into the inclined surface 36, a relative quantity of light, which leaks near the light entrance wedge portion 31 of the light exit surface 22 due to the light entrance wedge portion 31 and the inclined surface 36 (hereinafter, referred to as "degree of light leakage risk" or simply "degree of risk"), will depend on a quantity of light (light quantity) introduced into the inclined surface 36 and an angle of light relative to an optical axis when introduced into the inclined surface 36 (defined as an "incidence angle"). The above feature is expressible with the following equation.

"light quantity"×"incidence angle"="degree of light leakage risk"

In the present invention, the "optical axis" refers to a central axis extending from a center of a light emission surface 11*a* of the LED 11 while perpendicular to the light emission surface 11*a* (that is, the light entrance surface 21).

The reason why the degree of light leakage risk depends on the incidence angle is that transmittance of light penetrating from the inside of the light guide plate 20 to the outside in the inclined surface 36 depends on the incidence angle. The light quantity and the incidence angle depend on a distance from the light emission surface 11*a* of the LED 11 (which substantially coincides with the light entrance surface 21 of the light guide plate 20) in an optical axis direction.

In the light guide plate 20, which is a recent type and has advanced thin-contour and slim bezel, light introduced into the inclined surface 36 mainly includes 1) light that is firstly incident on the inclined surface 36 after being introduced from the light entrance surface 21 to the interior of the light guide plate 20 (hereinafter, referred to as "first incident light"), and 2) light that is re-introduced into the inclined surface 36 after the first incident light has been reflected from the rear surface 24 (hereinafter, referred to as "second incident light"). Here, however, the first incident light also includes light that is incident on the light entrance surface 21 and introduced into the interior of the light guide plate 20, then reflected from the rear surface 24, and firstly introduced into the inclined surface 36. It is true that there are lights introduced again into the inclined surface 36 after experiencing two or more times reflection from the rear surface 24, but light quantities in this case are quite small compared to the first incident light or the second incident light. Ratios in the light leakage will thus become too small to be able to be ignored.

Figure 2A:
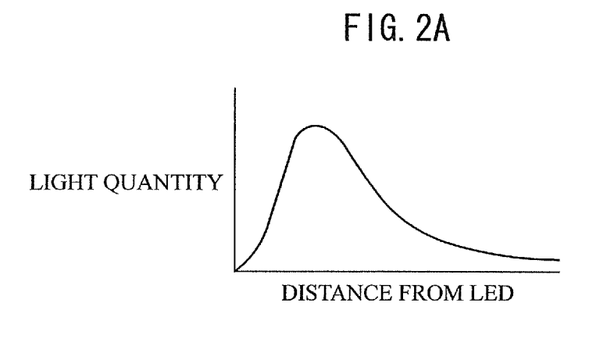
FIGS. 2A, 2B and 2C are images of degree of light leakage risk in the present invention, and are diagrams that schematically illustrate light quantity of first incident light on an inclined surface, an incidence angle, and a degree of light leakage risk.
Figure 2B:
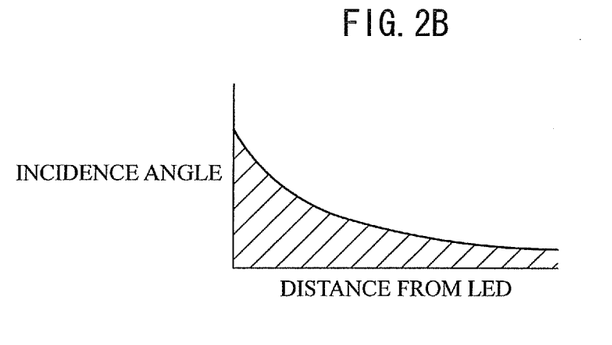
Figure 2C:
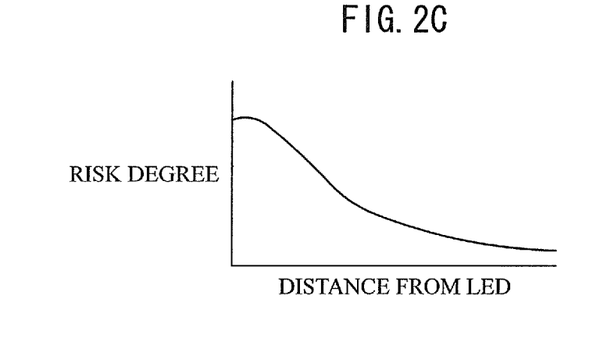

FIGS. 2A, 2B and 2C illustrate light quantity distributions, an incidence angle distributions and a degree of light leakage risk distributions when light is introduced into the inclined surface 36 as to the first incident light, respectively. These illustrated factors are each defined according to distance from the LED 11 in an optical axis direction. FIGS. 2A, 2B and 2C also easily illustrate some of the characteristics as to the degree of risk.

Figure 3:
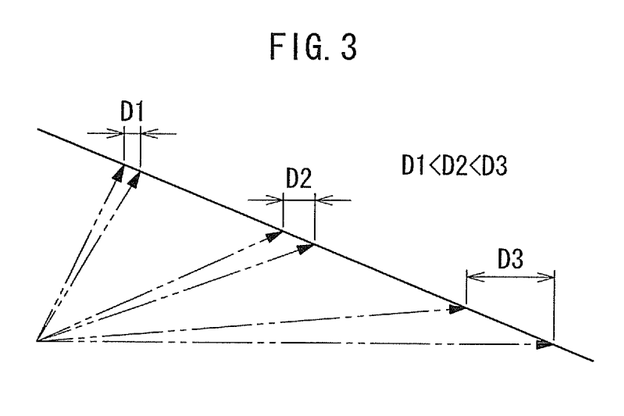
FIG. 3 illustrates an angle formed by light incident on an inclined surface relative to an optical axis, and a distance on an inclined surface corresponding to a predetermined angular width, thus explaining images of degree of light leakage risk in the present invention.

First, the light quantity is described. In an orientation distribution of light that has been radially emitted from the LED 11 as a whole and introduced into the light guide plate 20, the light quantity is maximized in an optical axis direction, and the light quantity decreases as an angle relative to the optical axis increases. However, as illustrated in FIG. 3, the width (corresponding to the width D in the optical axis direction) of the inclined surface 36 corresponding to unit angle starting from the center of the light emission surface 11*a* of the LED 11 becomes longer as the light beam is directed toward the optical axis direction, and becomes shorter as the angle formed with the optical axis increases (D1<D2<D3). Therefore, as illustrated in FIG. 2A, the quantity of light incident on the inclined surface 36 per unit distance (unit area) increases in a region close to the light entrance surface 21 as the distance from the LED 11 increases. However, the quantity of light is inverted after reaching a peak (maximum region) and decreases as the distance from the LED 11 increases.

Next, the incidence angle is described. As illustrated in FIG. 2B, the incidence angle of the light incident on the inclined surface 36 has a width (range) according to the distance from the LED 11. However, the upper limit of the range decreases as the distance from the LED 11 increases. Accordingly, as the distance from the LED 11 increases, the transmittance in the inclined surface 36 decreases.

Therefore, as illustrated in FIG. 2C, the degree of light leakage risk (product of the light quantity and the upper limit of the incidence angle) is maximized when the distance from the LED 11 is around zero. Moving more forward from that point, the degree of light leakage risk decreases as the distance from the LED increases.

Figure 4A:
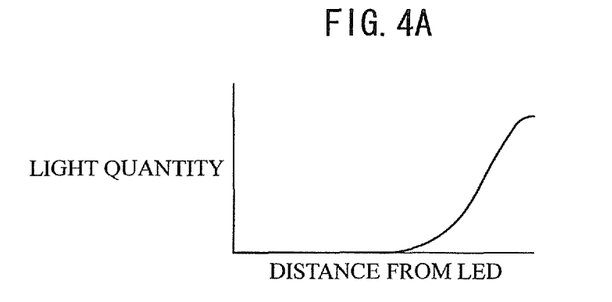
FIGS. 4A, 4B and 4C are images of degree of light leakage risk in the present invention and are diagrams that schematically illustrate light quantity of second incident light with respect to an inclined surface, an incidence angle, and a degree of light leakage risk.
Figure 4B:
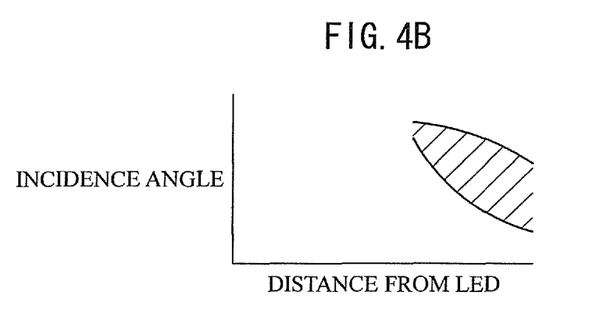

Next, the second incident light is described with reference to FIG. 4. FIGS. 4A, 4B and 4C illustrate light quantity distributions, an incidence angle distributions and a degree of light leakage risk distributions when light is introduced into the inclined surface 36 as to the second incident light, respectively. These illustrated factors are each defined according to distance from the LED 11. FIGS. 4A, 4B and 4C also easily illustrate some of the characteristics as to the degree of risk.

First, the light quantity is described. As illustrated in FIG. 4A, the distribution of the light quantity of the second incident light has a peak (maximum region) at a point moving more forward compared to the first incident light. Next, the incidence angle of the second incident light is described with reference to FIG. 4B. Since the angle changes upon reflection in the inclined surface 36 at the first time (the incidence angle is increased by about two times the incidence angle θ of the inclined surface 36), the upper limit of the incidence angle has a distribution overlapped with an angle variation after the distribution of the first incident light is shifted forward. Also, the lower limit of the incidence angle becomes a positive value corresponding to the distance from the LED 11. Like the upper limit, the lower limit has a tendency to decrease as the distance from the LED increases.

Figure 4C:
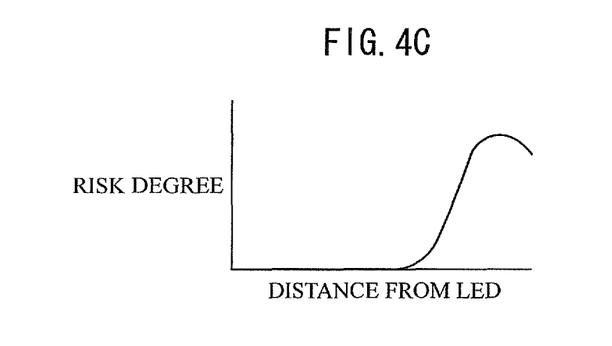

Therefore, as illustrated in FIG. 4C, the degree of light leakage risk of the second incident light basically has a distribution in which the distribution of light leakage risk of the first incident light is shifted forward. However, the degree of light leakage risk of the second incident light may increase more than the degree of light leakage risk of the first incident light, depending on the angle variation upon first reflection in the inclined surface 36.

Figure 5:
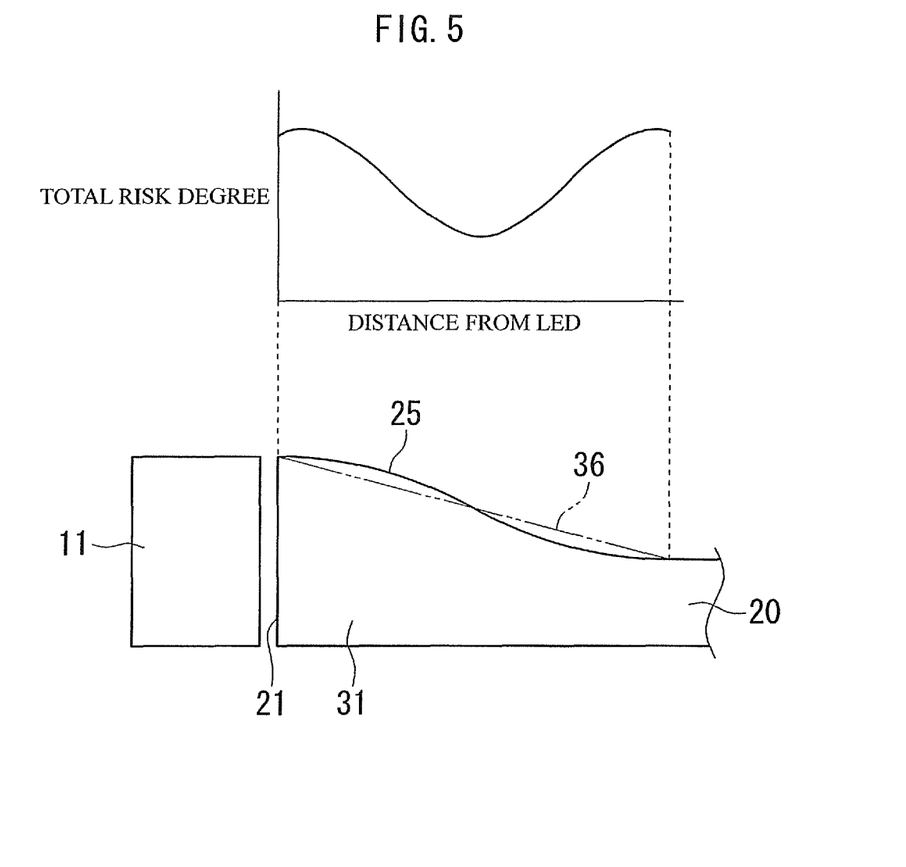
FIG. 5 illustrates a distribution of a total degree of light leakage risk in correspondence to a shape of a light entrance wedge portion.

A degree of risk obtained by adding the degree of light leakage risk of the first incident light to the degree of light leakage risk of the second incident light, that have been both obtained hereinabove, becomes a total degree of light leakage risk in the inclined surface 36 (see FIG. 5). As illustrated in FIG. 5, a region where the degree of light leakage risk is great (a region indicating a maximum value) exists at a position where the distance from the LED 11 is small (position close to the light entrance surface 21). As the distance from the LED 11 is increased more than that position, the degree of light leakage risk is gradually lowered. If the distance from the LED 11 is further increased, the degree of light leakage risk is inverted to gradually increase, and indicates a maximum value again. As a whole, the degree of light leakage risk has a concave shape of a curve whose central portion is recessed.

As described above, the present invention is made in view of the fact that the total degree of light leakage risk is divided into two regions including maximum (the maximum region of the light entrance surface 21 side and the maximum region of the light exit surface 22 side) and one region including minimum (the minimum region of the center). The first inclined surface portion 25*a* and the third inclined surface portion 25*c* are provided, respectively, in the ranges of the inclined surface 25 of the light entrance wedge portion 31, which correspond to the maximum regions of the light entrance surface 21 side and the light exit surface 22 side, and the second inclined surface portion 25*b* is provided in the range corresponding to the minimum region of the center. The average inclination angles θ1 and θ3 of the first inclined surface portion 25a and the third inclined surface portion 25c are made relatively smaller than the average inclination angle θ2 of the second inclined surface portion 25b. In this manner, light leakage occurring in the inclined surface 25 is efficiently reduced. Therefore, the spread illumination apparatus 10 can improve luminance of illumination light emitted from the light exit surface 22.

Furthermore, in the spread illumination apparatus 10, the shape of the inclined surface 25 is formed to have an S-shaped continuous curved surface in a sectional view, such that a region close to the light entrance surface 21 is convex and a region close to the light exit surface 22 is concave. In this manner, the optimal shape of the inclined surface for reducing light leakage from the inclined surface 25 can be realized according to the distribution of the total degree of light leakage risk.

Figure 6A:
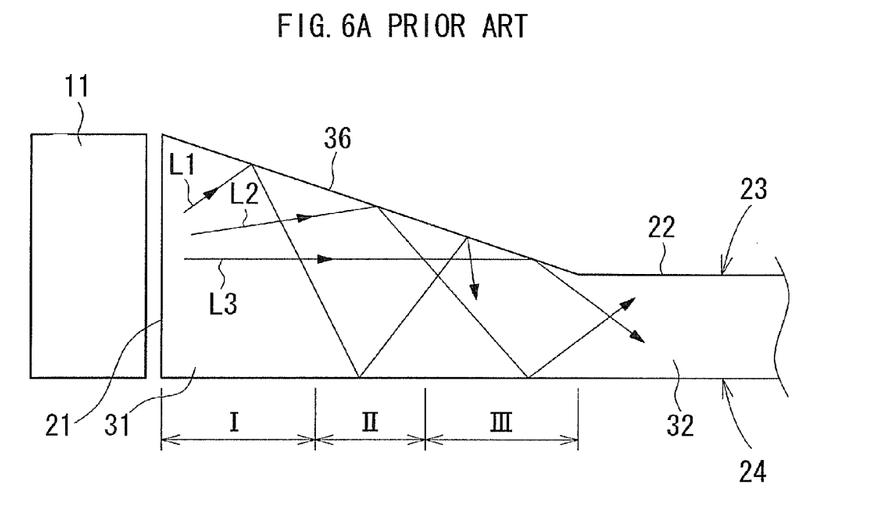
FIG. 6A is a side view illustrating a conventional spread illumination apparatus together with a plurality of incident light paths having different incidence angles.

Furthermore, as illustrated in FIG. 6, in a conventional spread illumination apparatus including an inclined surface 36 whose inclination angle is constant over an entire region of a light entrance wedge portion 31 (see FIG. 6A), light is emitted from an LED 11 toward a direction in which an angle relative to an optical axis is large. As a result, light L1 incident on a region I close to a light entrance surface 21 of the inclined surface 36 at a relatively large incidence angle is introduced toward a region III close to a light exit surface 22 of the inclined surface 36 as second incident light. This not only causes the high risks of light leakage, but a reflected light component may also be repetitively reflected between the inclined surface 36 and a rear surface 24 in a certain condition. This may provide a high tendency of light emitted near a light entrance wedge portion 31 of the light exit surface 22. In the conventional spread illumination apparatus, this light leakage appears to degrade the uniformity of luminance distribution of light emitted from the light exit surface 22.

Figure 6B:
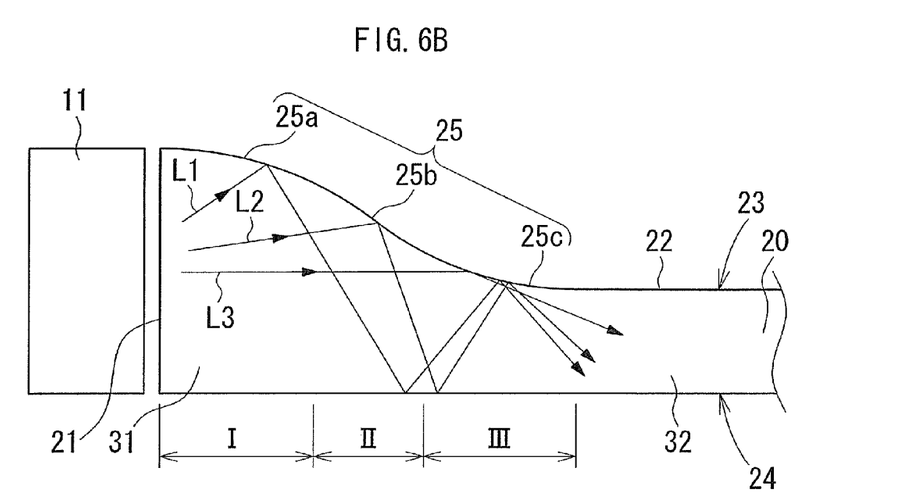
FIG. 6B is a side view illustrating the spread illumination apparatus of FIG. 1A together with a plurality of incident light paths having different incidence angles.

On the contrary, in the spread illumination apparatus 10 according to the present embodiment, the average inclination angles θ1 and θ3 of the first inclined surface portion 25a and the third inclined surface portion 25c are made relatively small. Therefore, as illustrated in FIG. 6B, even light (assigning reference numeral L1 as the same) introduced into the inclined surface 25 in the identical condition with L1 can be guided into the light exit portion 32, without emitting light near the light entrance wedge portion 31 of the light exit surface 22. Therefore, the spread illumination apparatus 10 can improve the uniformity of luminance distribution of light emitted from the light exit surface 22.

Figure 7:
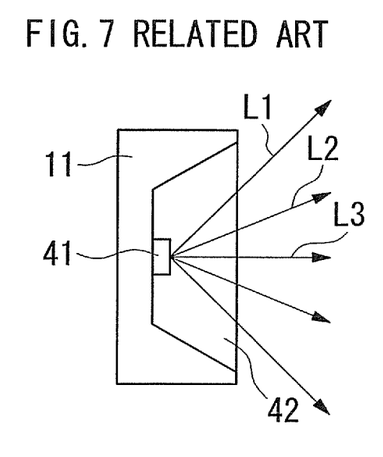
FIG. 7 is a sectional view illustrating a typical configuration of a pseudo white LED.

When the LED 11 is a so-called pseudo white LED, this spread illumination apparatus 10 will have the following effects. Generally, as illustrated in FIG. 7, the pseudo white LED is configured such that a blue light emitting chip 41 is encapsulated by a transparent resin 42 in which yellow phosphors are dispersedly provided. A light emission spectrum of pseudo-white-color is realized by a color mixture of blue light emitted by the blue light emitting chip 41 and yellow light emitted by the yellow phosphor absorbing the blue light. In this case, light L2 and light L3 are emitted from the LED 11 in a direction in which an angle relative to the optical axis is small. Compared to these light L2 and the light L3, the light L1 is emitted from the LED 11 in a direction in which an angle relative to the optical axis is large. The light L1 is thus longer than the light L2 and L3 in length passing within the transparent resin 42. Therefore, the light L1 tends to become white light tinged with yellow. As explained with FIG. 6A, light leakage due to the light L1 tends to occur near the light entrance wedge portion 31 of the light exit surface 22. This will also bring a problem that illumination light is partially tinged with yellow by the light leakage.

Considering the above, in the spread illumination apparatus 10, to reduce light leakage near the light entrance wedge portion 31 of the light exit surface 22 will bring effect of alleviating or solving the above problems, thus consequently improving chromaticity distribution of illumination light.

According to research and examination conducted by the present inventors, it is clearly noted that in the spread illumination apparatus 10 of the present embodiment, light leakage caused by the inclined surface 25 could be reduced by about 25% as compared with the conventional spread illumination apparatus including the inclined surface 36 having a constant inclination angle in the light entrance wedge portion 31. Also, through verification of the trial productions, it has been confirmed that the luminance of the illumination light emitted from the light exit surface 22 was improved by 4.5%.

Furthermore, in the spread illumination apparatus 10, the average inclination angle θ3 of the third inclined surface portion 25c, which is a portion connecting to the light exit surface 22 of the inclined surface 25, is smaller than the constant inclination angle θ of the conventional inclined surface 36. Therefore, it is possible to suppress luminance non-uniformity (acute change of luminance) caused by discontinuous connection of the inclined surface 25 and the light exit surface 22 at a constant intersection angle. This suppression effect becomes more remarkable when the inclined surface 25 of the spread illumination apparatus 10 is formed in a concave shape in the third inclined surface portion 25c, and the inclination angle of the portion connecting to the light exit surface 22 is made even smaller than the average inclination angle θ3.

Also, in the spread illumination apparatus 10, the average inclination angle θ1 of the first inclined surface portion 25a, which is a portion close to the light entrance surface 21 of the inclined surface 25, is smaller than the constant inclination angle θ of the conventional inclined surface 36. Therefore, in a case where a flexible printed circuit (FPC) (not illustrated) mounted with the LED 11 is directly fixed on the inclined surface 25 of the light guide plate 20, it is possible to alleviate a problem regarding the mounting of the LED 11, such as a problem that the light emission surface 11a of the LED 11 is inclined with respect to the light entrance surface 21 of the light guide plate 20.

Also, the second inclined surface portion 25b having the largest average inclination angle among the three inclined surface portions is arranged in the central portion in the light guide direction. Therefore, even when light leakage occurs from the second inclined surface portion 25b, it can be certainly absorbed generally by a light shielding member disposed on the inclined surface 25.

Also, in the example of FIG. 1A, it is illustrated that the inclined surface 25 has the inflection point A at substantially the center along the length direction (forward/backward direction) of the light entrance wedge portion 31, and the shape of the convex portion and the shape of the concave portion are formed almost congruently. However, in the present invention, it is apparent that the shape of the inclined surface 25 is not limited to the case having symmetry. In the spread illumination apparatus 10, a length ratio of the first inclined surface portion 25a, the second inclined surface portion 25b, and the third inclined surface portion 25c with respect to the entire length of the light entrance wedge portion 31, and the average inclination angles θ1, θ2 and θ3 of the first inclined surface portion 25a, the second inclined surface portion 25b, and the third inclined surface portion 25c are properly set while considering the actual distribution at the degree of light leakage risk. To be more specific, the position of the inflection point A may not be placed approximately at the center along the length direction of the light entrance wedge portion 31 but be placed at more toward the light exit surface 22. Further, the area of the convex portion may be configured to be larger than the area of the concave portion. Here, the distance of length direction between the light entrance surface 21 and the inflection point A is desired to be set at approximately 1.4 times as thick as the thickness of light entrance surface 21 (would be acceptable if it is set between 1.1 times and 1.7 times).

When the inflection point A is placed at more toward the light exit surface 22, the inclined surface 25 may be preferably configured as follows. For example, in case that the light guide plate 20 is configured such that: the thickness of the light entrance surface 21 is 0.58 mm; the thickness of the light exit portion 32 is 0.4 mm; and the length of the light entrance wedge portion 31 is 1.1 mm, one of the preferable constructions would be achieved if satisfying: 1) each length of the first inclined surface portion 25a, the second inclined surface portion 25b, and the third inclined surface portion 25c respectively corresponding to the region I, the region II and the region III are set 0.4 mm, 0.4 mm and 0.3 mm, and 2) each of the average inclination angles $\theta 1$, $\theta 2$ and $\theta 3$ corresponding to the first inclined surface portion 25a, the second inclined surface portion 25b, and the third inclined surface portion 25c are set 6.4°, 13° and 8.2° (the average inclination angle $\theta$ along the whole length of the inclined surface 25 is 9.3°).

Figure 8:
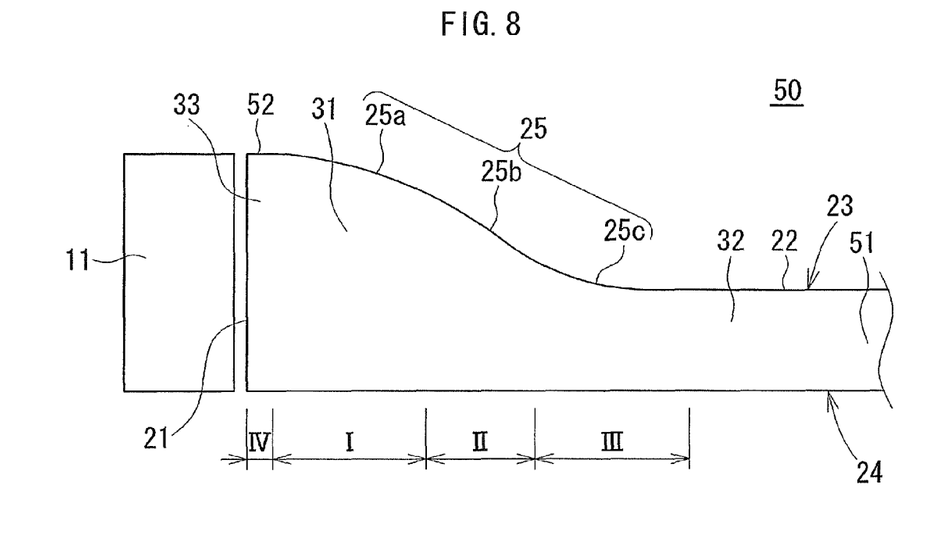
FIG. 8 is a side view illustrating essential parts of a spread illumination apparatus according to another embodiment of the present invention.

Like a spread illumination apparatus 50 of FIG. 8, the spread illumination apparatus according to the present invention may include a flat portion 33 (a range denoted by "IV" in FIG. 8) between a light entrance surface 21 and a light entrance wedge portion 31 of a light guide plate 51. The flat portion 33 extends from the light entrance surface 21, connects to a first inclined surface portion 25a, and has a top surface 52 parallel to a light exit surface 22. The flat portion 33 has a constant thickness.

Figure 9:
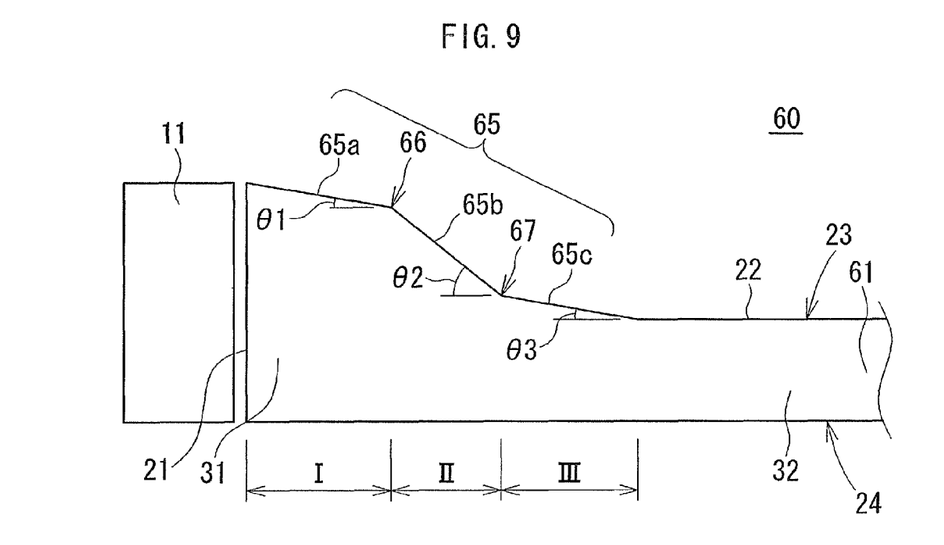
FIG. 9 is a side view illustrating essential parts of a spread illumination apparatus according to another embodiment of the present invention.

Also, like a spread illumination apparatus 60 of FIG. 9, the spread illumination apparatus according to the present invention may include a first inclined surface portion 65a, a second inclined surface portion 65b, and a third inclined surface portion 65c of an inclined surface 65 which are configured as inclined surfaces having predetermined inclination angles $\theta 1$, $\theta 2$ and $\theta 3$, respectively. In other words, the spread illumination apparatus 60 includes a configuration in which virtual plane surfaces 35a, 35b and 35c illustrated in FIG. 1B are realized as actual inclined surfaces, respectively. The spread illumination apparatus 60 is advantageous in that the inclined surface 65 according to the present invention can be relatively easily formed.

Also, in the spread illumination apparatus 60, either or both of a connecting portion 66 of the first inclined surface portion 65a and the second inclined surface portion 65b, and a connecting portion 67 of the second inclined surface portion 65b and the third inclined surface portion 65c may be configured as a curved surface. Furthermore, in the spread illumination apparatus 60, one or more inclined surface portions among the first, second and third inclined surface portions 65a, 65b and 65c may be configured as a plurality of inclined surfaces having different inclination angles. In this case, one or more connecting portions among connecting portions of the respective inclined surfaces may be configured as a curved surface.

In any of the above embodiments, the cross-sectional shape of the cross section (side cross section) perpendicular to the light entrance surface 21 and the light exit surface 22 of the light entrance wedge portion 31 is identical to the side surface shape at an arbitrary position of the light entrance surface 21 in the longitudinal direction. Therefore, the inclined surfaces 25 and 65 were formed to have no inclination along the longitudinal direction of the light entrance surface 21. However, in the spread illumination apparatus according to the present invention, the shape of the inclined surface of the light entrance wedge portion may have an inclination along the longitudinal direction of the light entrance surface 21.

Figure 10A:
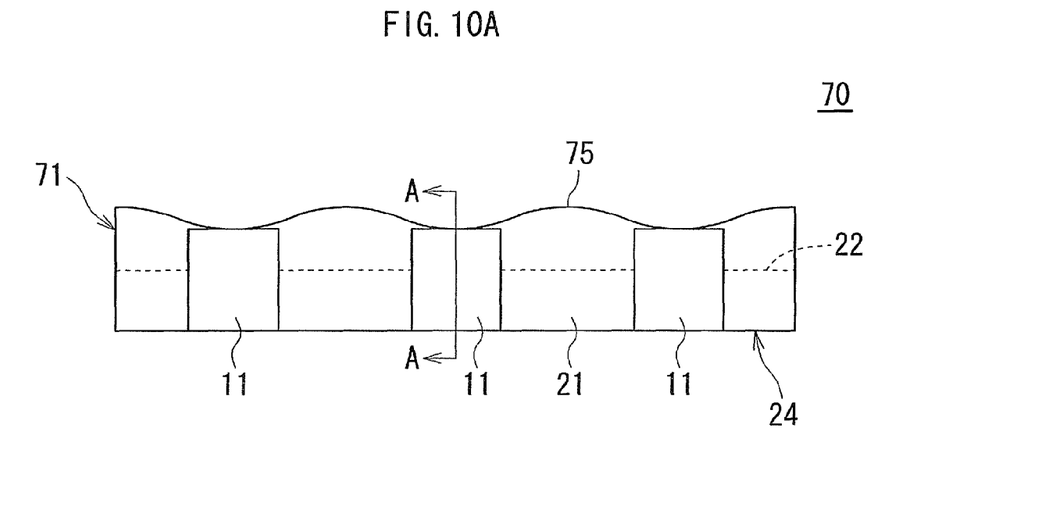
FIG. 10A is an elevation view illustrating essential parts of a spread illumination apparatus according to another embodiment of the present invention.
Figure 10B:
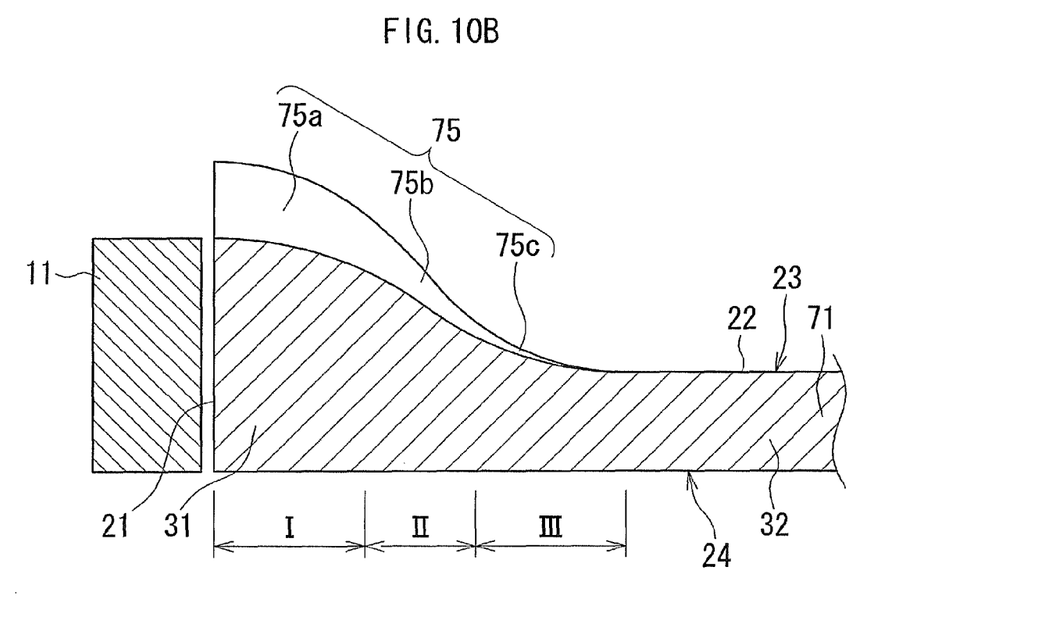
FIG. 10B is an A-A cross-sectional view of FIG. 10A.

FIG. 10 is a diagram illustrating an example of such a spread illumination apparatus 70, in which FIG. 10A is a front view (elevation view) of the spread illumination apparatus 70 when viewed from a light entrance surface 21 side, and FIG. 10B is an A-A cross-sectional view of FIG. 10A. In the spread illumination apparatus 70, the light entrance surface 21 of a light guide plate 71 is configured such that the thickness thereof changes spatially along the longitudinal direction of the light entrance surface 21. Specifically, the thickness of the light entrance surface 21 is configured such that the thickness at the arrangement position of each LED 11 is approximately equal to the thickness of the LED 11, and the thickness on both sides of the arrangement position of each LED 11 is thicker than the thickness at the arrangement position of the LED 11. An inclined surface 75 is configured to be inclined downward from the light entrance surface 21 toward the forward direction over the entire width of the light entrance surface 21 along the longitudinal direction and to be connected to the light exit surface 22 at the forward end of the inclined surface 75.

Therefore, the inclined surface 75 has not only an inclination along the forward/backward direction (light guide direction) but also an inclination along the left/right direction (a longitudinal direction of the light entrance surface 21). Due to this configuration, the average inclination angle over the entire length of the light entrance wedge portion 31 of the inclined surface 75 also changes spatially along the longitudinal direction of the light entrance surface 21, such that the average inclination angle is the smallest at the arrangement position of each LED and is the largest on both sides of the arrangement position of each LED 11. However, in the spread illumination apparatus 70, within the side cross section at an arbitrary position of the light entrance surface 21 along the longitudinal direction, the average inclination angle within the side cross section of a second inclined surface portion 75b is larger than the average inclination angle within the same side cross section of a first inclined surface portion 75a and a third inclined surface portion 75c, which is the same as the spread illumination apparatus 10. Furthermore, in the spread illumination apparatus 70, within the side cross section at an arbitrary position of the light entrance surface 21 along the longitudinal direction, the average inclination angles within arbitrary side cross sections of the first inclined surface portion 75a and the third inclined surface portion 75c are formed to be smaller than the average inclination angle over the entire length of the light entrance wedge portion 31 within the same side cross section.

Due to such a configuration, the spread illumination apparatus 70 obtains the same operational effect as the spread illumination apparatus 10 and has the inclined surface 75 inclined along the longitudinal direction of the light entrance surface 21. Therefore, light incident with an incidence angle width on the inclined surface 75 in the thickness direction is reflected to be spread in a direction parallel to the light exit surface 22. As a result, when the reflected light from the inclined surface 75 is reflected from the rear surface 24 and is incident again on the inclined surface 75 (typically, the third inclined surface portion 75c), the incidence angle thereof can be made small. Therefore, light leakage near the light entrance wedge portion 31 of the inclined surface 75 and the light exit surface 22 can be reduced more effectively.

Also, in the spread illumination apparatus 70, the length of the light entrance wedge portion 31 is assumed to be constant along the longitudinal direction of the light entrance surface 21. However, in the spread illumination apparatus according to the present invention, the inclination along the longitudinal direction of the light entrance surface 21 may be provided in the inclined surface of the light entrance wedge portion 31 by changing the length of the light entrance wedge portion 31 spatially along the longitudinal direction of the light entrance surface 21. In this case, as compared with the spread illumination apparatus 70 illustrated in FIG. 10, the spatial variation of the average inclination angle over the entire length of the light entrance wedge portion 31 of the inclined surface along the longitudinal direction of the light entrance surface 21 can be suppressed to become relatively small.

Here, in the above-described embodiments, the inclined surfaces 25, 65 and 75 of the light entrance wedge portion 31 are assumed to be all formed in the front surface 23 side of the light guide plates 20, 51, 61 and 71. However, in the spread illumination apparatus according to the present invention, the inclined surfaces 25, 65 and 75 may be formed in the rear surface 24 side of the light guide plates 20, 51, 61 and 71. Alternatively, the spread illumination apparatus has the inclined surface of the light entrance wedge portion 31 in both of the front surface 23 side and the rear surface 24 side of the light guide plates 20, 51, 61 and 71. Either or both of the two inclined surfaces may be configured as the inclined surfaces 25, 65 and 75 according to the present invention. In this case, when only one of the two inclined surfaces is configured as the inclined surfaces 25, 65 and 75, the other inclined surface may be configured as an inclined surface having a constant inclination angle as in the prior art.

Also, when an FPC mounted with the LED 11 is arranged in the plane side where the inclined surface (the inclined surfaces 25, 65 and 75 according to the present invention or the conventional inclined surface) is provided among the front surfaces 23 and the rear surfaces 24 of the light guide plates 20, 51, 61 and 71, a pedestal may be installed for arranging the FPC integrally with the inclined surface provided in the plane side. The pedestal is provided in a predetermined range extending forward from the left/right side of the arrange position of each LED 11 of the light entrance surface 21 (preferably, a range where no light is almost incident).

It is apparent that the spread illumination apparatus according to the present invention includes a spread illumination apparatus with an arbitrarily combined configuration of the characteristics described in relation to the above-described individual embodiments. For example, the spread illumination apparatuses 10, 60 and 70 may include the flat portion 33 described in relation to the spread illumination apparatus 50.

What is claimed is:

1. A spread illumination apparatus, comprising:
a light source; and
a light guide plate having a light entrance surface on which the light source is disposed, a light exit surface through which light introduced from the light entrance surface is emitted, and a rear surface facing the light exit surface
wherein the light guide plate includes a light entrance wedge portion which has an inclined surface and which has a thickness that becomes thinner from the light entrance surface side toward the light exit surface side,
the inclined surface includes, from the light entrance surface side, a first inclined surface portion, a second inclined surface portion, and a third inclined surface portion, the first inclined surface portion, the second inclined surface portion and the third inclined surface portion each inclined at certain angles relative to the rear surface, the certain angles being greater than 0°, and
an average inclination angle of the second inclined surface portion at an arbitrary cross section perpendicular to the light entrance surface and the light exit surface along the light entrance surface in a longitudinal direction is configured to be larger than average inclination angles of the first inclined surface portion and the third inclined surface portion at the same cross section.

2. The spread illumination apparatus according to claim 1, wherein a connecting portion of the first inclined surface portion and the second inclined surface portion, and a connecting portion of the second inclined surface portion and the third inclined surface portion are configured as a curved surface.

3. The spread illumination apparatus according to claim 1, wherein the inclined surface is configured as a single continuous curved surface as a whole.

4. The spread illumination apparatus according to claim 3, wherein the continuous curved surface is a curved surface which has a convex shape in the light entrance surface side and a concave shape in the light exit surface side.

5. The spread illumination apparatus according to claim 4, wherein the continuous curved surface is formed in an S-shape in section, and has an inflection point within the second inclined surface portion.

6. The spread illumination apparatus according to claim 1, wherein at least one of the first inclined surface portion, the second inclined surface portion, and the third inclined surface portion is configured to have a plurality of flat surfaces.

7. The spread illumination apparatus according to claim 1, wherein the inclined surface is provided on the light exit surface side.

8. The spread illumination apparatus according to claim 1, wherein a flat portion with a constant thickness is provided between the light entrance surface and the light entrance wedge portion.

9. The spread illumination apparatus according to claim 1, wherein a shape of the inclined surface is formed to have an S-shaped smooth continuous curved surface in a sectional view, such that a region close to the light entrance surface is convex and a region close to the light exit surface is concave.

* * * * *